Feb. 8, 1938. W. D. WILLIAMS 2,107,683
ANIMAL TRAP
Original Filed June 19, 1935   3 Sheets-Sheet 1

Inventor
Wilbur D. Williams
By Clarence A. O'Brien
Attorney

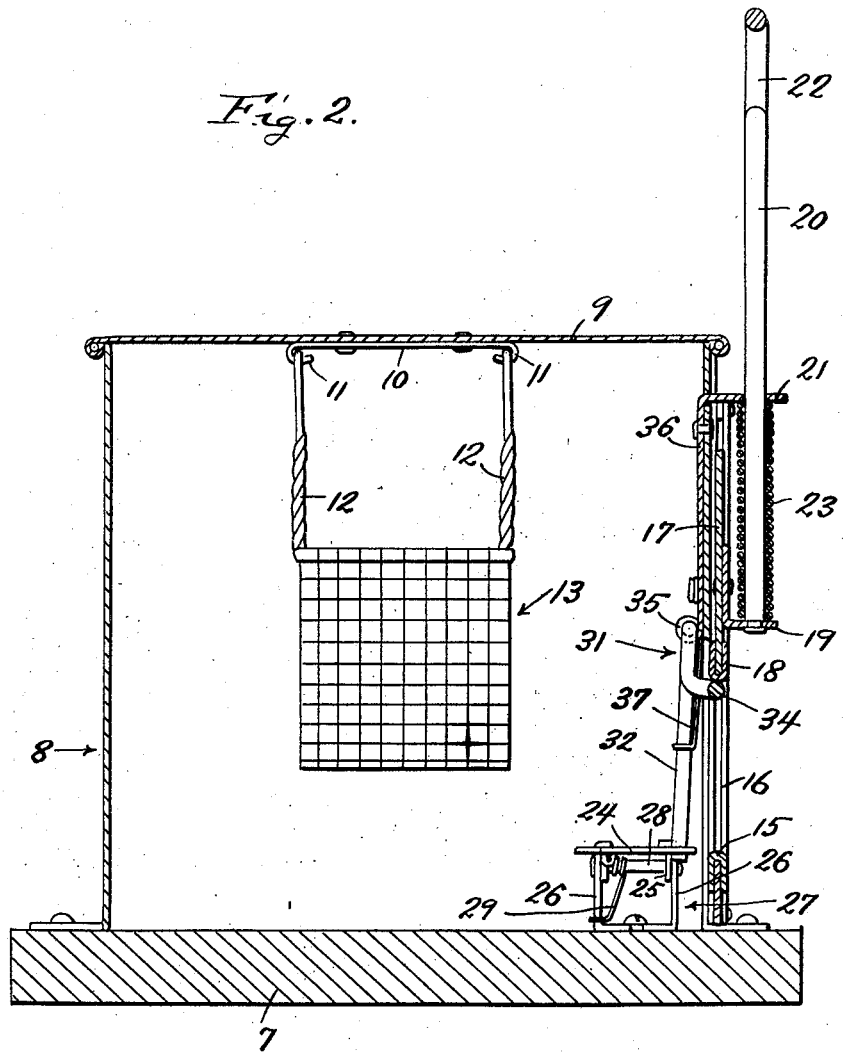

Feb. 8, 1938. W. D. WILLIAMS 2,107,683
ANIMAL TRAP
Original Filed June 19, 1935   3 Sheets-Sheet 3

Inventor
Wilbur D. Williams
By Clarence A. O'Brien
Attorney

Patented Feb. 8, 1938

2,107,683

UNITED STATES PATENT OFFICE 2,107,683

ANIMAL TRAP

Wilbur Darrel Williams, Washington C. H., Ohio

Application June 19, 1935, Serial No. 27,444
Renewed July 12, 1937

5 Claims. (Cl. 43—78)

This invention relates to an improved animal trap and has more particular reference to that class of traps utilized for snaring and trapping rodents, particularly rats.

Admittedly, the field of invention to which the improved structure relates is well developed and characterized by many analogous varieties and embodiments of traps. Therefore, in carrying the present inventive idea into actual practice and in perfecting the fundamental principles thereof, I have evolved and produced a type of trap distinguishable from known types in that it embodies a number of noteworthy refinements and improvements calculated to better fulfill the requirements of a structure of this classification.

One advantageous result obtained through the instrumentality of my improved trap is the special selection and mechanical co-ordination of parts which operate in unison and proper continuity to promote sensitivity of actuation and dependable trapping.

Briefly stated, the preferred embodiment of the invention comprises a base provided with a casing having a removable top carrying a depending interiorly located bait receptacle, the casing being provided in one or more walls with a doorway, a special spring closed door, and an animal actuated trip device on the interior, and co-acting means between the trip device and door to permit the door to be lowered to provide the desired impact and maintenance action, whereby the animal is virtually trapped before he actually enters the casing.

Other features and advantages will become more readily apparent from the following description and drawings.

In the drawings:—

Figure 2 is a substantially vertical sectional view, with the treadle plate shown in elevation, the section being taken centrally on the line 2—2 of Figure 3.

Figure 1:
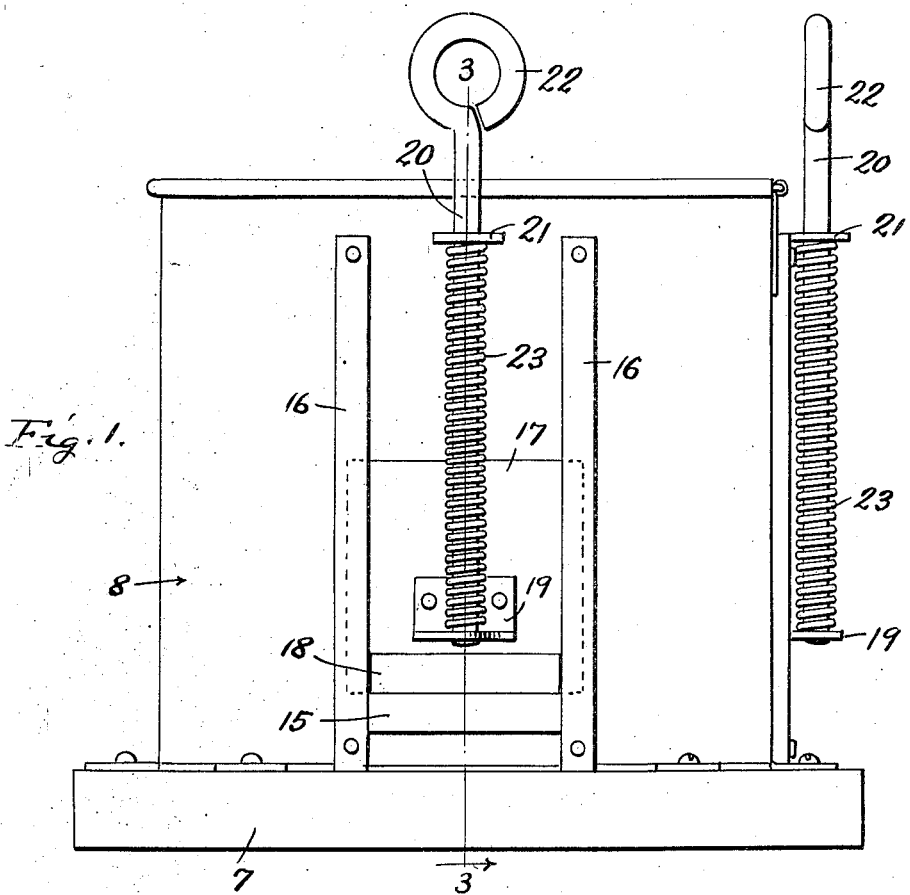
Figure 1 is an elevational view of the preferred embodiment of the invention.
Figure 6:
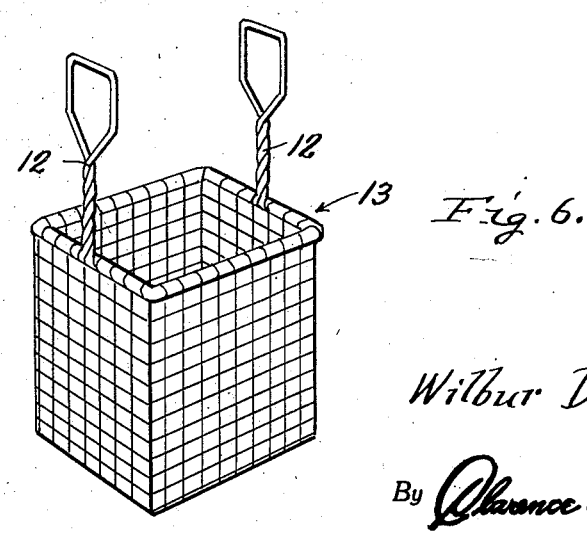
Figure 6 is a perspective detail view of the bait receptacle or basket.

In the drawings, the numeral 7 designates the base, this being in the form of a block of appropriate material and proportions. Attached to this base is a suitable metal enclosure or casing 8. This is here shown as of general rectangular form and is open at its top to accommodate a removable cover 9. As shown in Figure 2, the cover is formed on its under side with a hanger 10 having suspension hooks 11 at its ends to support the suspension arms 12 of the bait basket or receptacle 13. This permits the basket to be hung down centrally to render it visible from any side of the trap. By removing the top, the arms 12 can be disengaged from the hooks 11 to conveniently fill the basket when desired. As a general rule, however, the basket can be filled without disconnecting it from the hooks 11.

As before implied, it is desirable to have two or more of the walls of the casing provided with closure and trapping mechanism. The mechanism is structurally the same in each instance and a description of one assembly will suffice for all.

Figure 3:
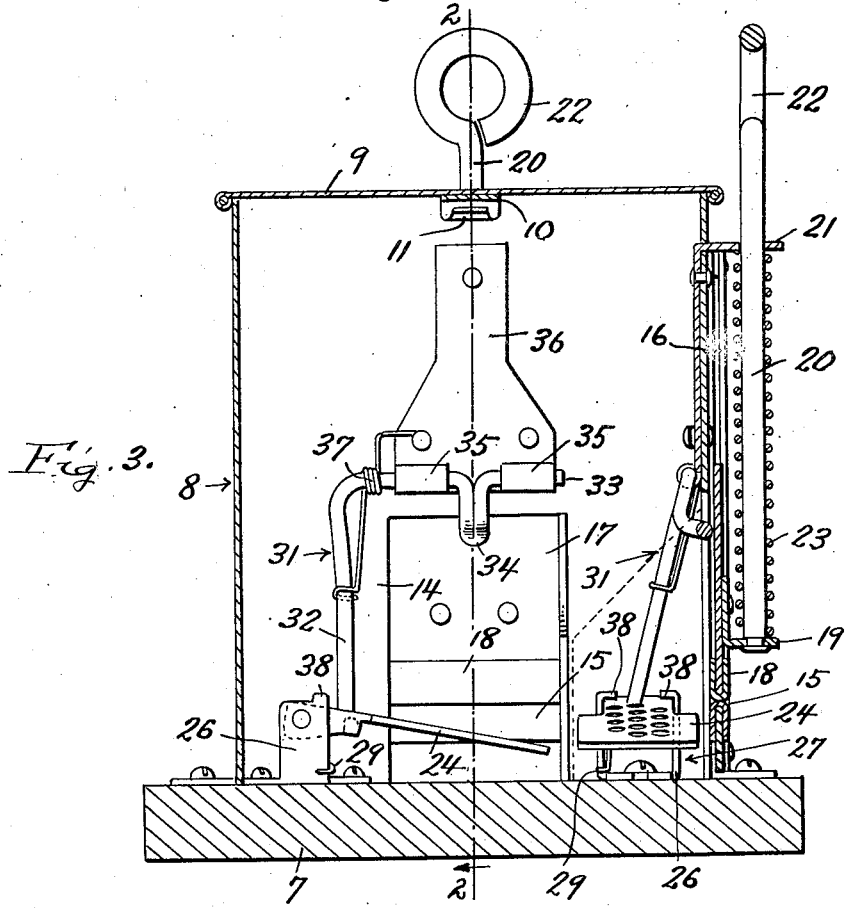
Figure 3 is a similar vertical sectional view taken on the plane of the line 3—3 of Figure 1.
Figures 4, 5:
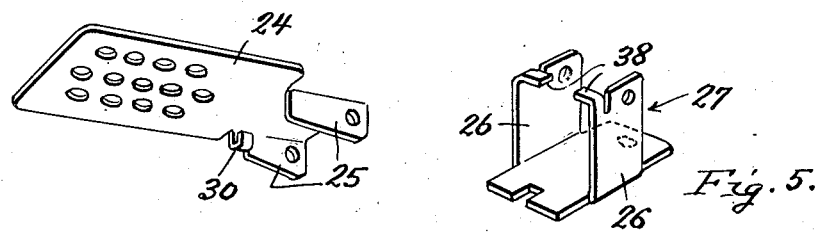
Figures 4 and 5 are perspective detail views.

Proceeding with this in mind, it will be observed that the numeral 14 in Figure 3 designates the doorway. At the bottom of the doorway is a riser having its edge reinforced, as indicated at 15. On the exterior of the wall and along vertical sides of the doorway are guide channels 16 for the panel-like door 17. The lower end of this door is beaded or reinforced, as at 18, so that the parts 15 and 18 come together to virtually grab the animal midway of its body with sufficient force not only to retain the animal, but also to produce a telling blow.

On its exterior, the door is provided with an attaching bracket 19 to which a lifting rod 20 is swivelly connected. The rod extends up through a guide bracket 21 and terminates at its upper end in a finger ring 22 for convenient grasping and setting. The numeral 23 designates a coiled spring which surrounds the rod, bearing at opposite ends against the brackets 19 and 21. Thus as the door is lifted through the instrumentality of the finger ring 22 and its rod 20, the spring 23 is compressed between the parts 19 and 20. Means must, therefore, be provided to hold the door in this elevated position and to permit it to be lowered at the proper instant to obtain the desired trapping action. This means is in two parts. I first call attention to the animal actuated trip means. This comprises a treadle plate 24 having apertured attaching ears 25 pivotally connected to upstanding arms 26 on an anchoring fixture 27. The fixture is secured to the base just inwardly of the door and slightly out of the path of the doorway 14, as shown better in Figure 3. The pivotal connection between these parts is made by way of a pivot pin 28, as shown in Figure 2. Then there is a spring 29 which surrounds the pin having one end engaged in a retaining hook 30 on the under side of the treadle plate and the other end engaged with one of the arms 26 of the anchoring bracket. The spring serves to normally hold the treadle plate in an elevated position. This is desired because one of the aforesaid ears 25 constitutes an abutment or stop device for the door retaining latch 31.

The latch unit 31, as shown to advantage in Figure 3, is of general L-shaped form. The depending latch member 32 bears against the abutment 25 as long as the plate 24 is elevated by the spring. The horizontal rocker arm portion 33 is formed intermediate its ends with a hook 34 which protrudes out through the door opening and engages under the lower end portion 18 of the door, as shown in Figure 2. As is evident from the preceding description, the so-called latch unit 31 is a one-piece member comprising the latch arm proper and the rocker shaft 33 which shaft or arm 33 is rockably mounted in bearings 35 forming part of an adapter plate 36. This is secured to the inside of the wall and one end of the spring 37 is engaged with this plate 36, the coiled portion being wrapped around the arm 33 and the other end of the spring being engaged with the depending trip engaging arm 32. Incidently, the spring 37 is so wound as to swing the arm 32 from the tripped position shown in Figure 3 to the set position shown in Figure 2.

In order that the operation of the trap may be understood, it is to be remembered that the spring 29 of the animal actuated trip device or treadle 24 serves normally to elevate said treadle plate and in doing this, it swings the plate up against the inturned stop ears 38 on the anchoring bracket 27. Secondly, the spring 37 normally swings the arm or leg 32 outwardly toward the door opening and in so doing, automatically engages the retention hook 34 with the lower edge portion of the door 17, when said door is elevated. It follows, therefore, that by catching hold of the finger ring 22 and lifting the rod 20, this also lifts the door and compresses the spring 23. When the door reaches a predetermined elevation, the spring 37 comes into play to automatically snap the hook 34 underneath the edge of the door to hold the door elevated. Likewise, the extreme lower end portion of the leg or arm 32 swings across the treadle plate and drops down behind the adjacent stop ear 25 as the spring 29 lifts said plate 24 to its extreme elevated position. Thus the treadle plate serves as a means for holding the hook 34 in door retaining position against the tension of the spring 37. Of course, the spring 23 is much stronger than the spring 37 and has to overcome the tension of the spring 37 when the door 17 is lowered.

Now then, as the animal enters the doorway and makes an effort to get at the bait in the cage 13, he naturally steps on the treadle plate 24. His weight is sufficient to depress the treadle plate against the tension of its spring 29. This permits the lower end of the trip arm of the latch device to swing across the treadle plate, that is, to clear the treadle plate. This movement of the latch device is accomplished by the downward pressure of the stronger spring 23. As the hook 34 swings clear of the door, said door comes down with a bang, grabbing the animal between the parts 15 and 18 so that it can be removed and disposed of in any manner desired.

Particular emphasis is placed on the arrangement whereby the trap is automatically set. In other words, by simply grasping and lifting the rod 20, the other features co-ordinated therewith automatically come into play and hold the trap thus set. Notwithstanding this continuity of spring action, it is evident that the moment the treadle 24 is depressed by the animal, the door is allowed to close down with a positive animal retaining an impact action.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

What is claimed is:—

1. A rat trap of the class described comprising a casing provided on its interior with a bait holder, said casing having a doorway formed in at least one of its side walls to facilitate partial entry of the animal into the casing, a pair of vertical channeled guides on the exterior of said wall, a panel-like door slidable in said guides, a bracket attached to the outside of said door, a guide fixed to the outside of said wall, a rod slidable in said guide and attached at its lower end to said bracket, a coiled spring surrounding said rod between the bracket and guide, the upper end of said rod being provided with a finger ring, an animal actuated trip device on the interior of the casing adjacent said doorway, and an operating connection between said trip device and door, said operating connection comprising a substantially L-shaped pivotally mounted spring actuated latch having one end engageable with the trip means and the other end engageable with the door when the door is in elevated position.

2. In a structure of the class described, a casing provided on its interior with a bait holder, the casing being provided in at least one side wall with a doorway, a slidable exteriorly arranged door co-operable with the doorway, spring pressed actuating and lifting means for said door, a spring elevated pivotally mounted treadle plate on the interior of the casing adjacent the doorway, a substantially L-shaped latch, the horizontal portion of said latch being pivotally mounted on the interior of said casing and formed with a hook engageable with the lower edge of the door when said door is elevated, the depending arm of said latch having its lower end engageable with said treadle plate, and spring means associated with said latch for normally moving the hook into automatic engagement with the door after the door has been elevated to a predetermined point to facilitate setting of the trap.

3. In a structure of the class described, a base, a casing attached to said base, a bait holder removably mounted on the interior of said casing, one wall of said casing being provided with a doorway, a slidable automatically lowered manually liftable door co-operable with said doorway, an anchoring bracket mounted on the base on the interior of said casing and including upstanding arms having inturned stop fingers, a treadle plate having apertured ears pivotally attached to said upstanding arms, the pivoted end portion of said plate being engageable with said stop fingers, spring means associated with one of said arms and the pivotal mounting of said plate for normally elevating the plate to a predetermined level, and a pivotally mounted spring actuated latch on the adjacent wall of said casing, said latch having one end engageable with the door and the other end engageable with the pivoted end portion of said plate.

4. A trap of the class described comprising a casing having bait holding means on its interior and a doorway in one side, a slidable door for closing said doorway, spring means for forcing said door downwardly to closing position, a pivotally mounted spring elevated animal actuated trip plate on the interior of said casing adjacent the doorway, an adapter element on the interior of the wall of the casing, an L-shaped latch, the horizontal arm thereof being pivotally attached to said adapter element and formed with a hook engageable with the lower edge of said door when the door is elevated, the depending arm of said latch being engageable with the pivoted end of said trip plate, utilizing said plate as a stop for said depending arm, and a spring associated with said L-shaped latch and anchored on said adapter element, said spring serving to normally swing the latch outwardly so as to engage the hook automatically with the door when the door is lifted to a predetermined elevated position, the spring lowering means of said door being sufficiently strong to overcome the spring tension of the latch spring in the manner described.

5. A rat trap of the class described comprising a casing having a doorway formed in one of its vertical walls to facilitate partial entry of the rat into the casing, bait holding means in said casing, a vertically slidable door mounted on the aforementioned vertical wall and cooperable with said doorway, a bracket attached to said door, a lifting rod swivelly connected to and rising from said bracket, a coiled spring bearing at one end against the bracket and surrounding the rod, a relatively fixed abutment on the casing with which the opposite end of the spring is engaged, an animal tripped treadle mounted in the casing in alignment with the doorway and extending across the path of entry of the rat, a pivotally mounted hook engageable beneath the lower end of the door to hold the door in elevated position against the tension of said spring, said hook being disposed on the interior of the casing and including a depending integral latch releasably engageable with said treadle, and spring means cooperable with said latch in the manner and for the purposes described.

WILBUR D. WILLIAMS.